Jan. 4, 1955 — R. L. CAMPING ET AL — 2,698,666

PROPELLER BLADE

Filed July 1, 1952

INVENTORS
ROBERT L. CAMPING
ROBERT C. TRESEDER
BY
THEIR ATTORNEYS

United States Patent Office 2,698,666
Patented Jan. 4, 1955

2,698,666

PROPELLER BLADE

Robert L. Camping and Robert C. Treseder, Dayton, Ohio, assignors to General Motors Corporation, Detroit, Mich., a corporation of Delaware Application July 1, 1952, Serial No. 296,676

5 Claims. (Cl. 170—159)

The present invention relates to propeller blades and more particularly to hollow aircraft propeller blades. Heretofore in the use of hollow steel blades on amphibious aircraft considerable difficulty has been encountered with water erosion. With the use of hollow propeller blades of the type comprising a thrust member and a camber sheet brazed thereto to complete the air foil, a similar problem is anticipated. Specifically, when the tip and leading edge portions of blades are subjected to impingement with a spray of water during landing of amphibious aircraft, the camber sheet might separate from the thrust member at the brazed juncture therebetween along a portion of the tip and leading edge of the blade. If this phenomenon should occur, it would require removal and replacement of the blades at frequent intervals. Accordingly, one of our objects is to provide an improved blade construction with means for preventing the separation of the camber and thrust members due to impingement with water spray.

The aforementioned and other objects are accomplished in the present invention by disposing the brazed connection or joint between the thrust and camber members away from the leading edge and the tip of the blade throughout a portion of the airfoil surface. In accordance with this expedient, the forged thrust member is provided with a gradually enlarged solid leading edge portion adjacent the tip, the tip also being formed by a solid portion of the thrust member. A rim is undercut along the inner edge of the solid portion, the depth thereof being substantially equal to the thickness of a camber sheet. The camber sheet is of less length than the airfoil portion of the thrust member and is provided with a gradually relieved leading edge portion adjacent the tip thereof. The camber sheet is positioned on the thrust member in such a manner that the surfaces of the forged thrust member and the camber sheet adjacent the portion of the leading edge and tip are flush, after which the intimate contacting areas thereof are united by any suitable means.

Further objects and advantages of the present invention will be apparent from the following description, reference being had to the accompanying drawing wherein a preferred embodiment of the present invention is clearly shown.

Figure 1:
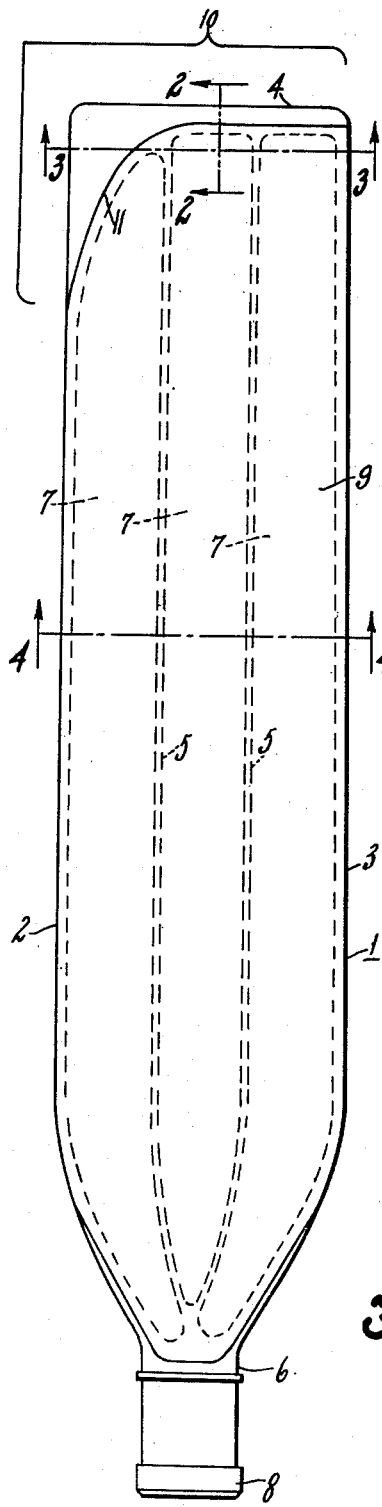
Fig. 1 is a plan view of the improved propeller blade.

Referring more particularly to the drawing, a propeller blade is shown comprising a forged thrust member 1 which may be of steel. The integral thrust member 1 includes an airfoil portion having a reinforced leading edge 2, a reinforced trailing edge 3, a reinforced tip 4, and any number of longitudinally extending ribs 5. The ribs extend from a shank portion 6 of the thrust member to the tip portion 4 thereof and a plurality of cavities 7 are formed between the upstanding ribs and the upstanding reinforced trailing and leading edge portions. The shank portion is of hollow cylindrical shape from the root end 8 to the airfoil portion and is integral with the thrust member 1. The airfoil section of the blade is completed by a formed steel camber sheet 9, which is united with the upstanding portions of the thrust member by any suitable means, such as brazing or fusion welding. The blade construction is generally of the type disclosed in Patent No. 2,205,132, in the name of Blanchard, in which the forged thrust member 1 sustains the loads imposed on the blade. Any number of ribs 5 may be provided, depending on the rigidity desired.

Figure 2:
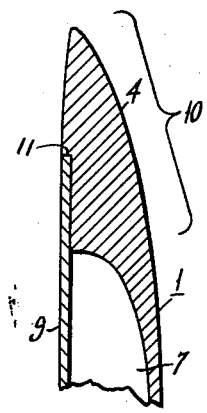
Fig. 2 is an enlarged fragmentary sectional view taken on line 2—2 of Fig. 1.
Figure 3:
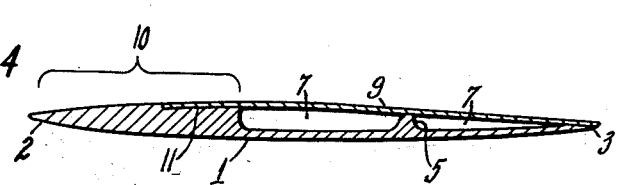
Fig. 3 is an enlarged sectional view taken on line 3—3 of Fig. 1.
Figure 4:
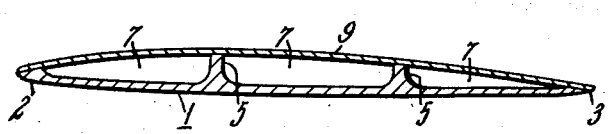
Fig. 4 is an enlarged sectional view taken on line 4—4 of Fig. 1.

As previously mentioned, considerable difficulty has been experienced with hollow blades used on amphibious aircraft. When these blades are subjected to continual impingement with water spray, erosion of the tip material occurs. To eliminate the surface discontinuities which facilitate erosion and to provide for better reworking of the blade contour should erosion occur, the thrust member 1 and the camber sheet 9 are modified according to the present invention. Referring particularly to Fig. 1, the leading edge portion 2 of the thrust member is of gradually increasing area in the direction of width of the blade throughout at least one tenth of the blade length, and a substantial portion of the tip 4 is formed by a solid portion of the thrust member 1. The modified area of the thrust member is that generally depicted within the bracket 10 of Figs. 1 to 3. Within the area 10 a rim 11 is undercut, the depth thereof being substantially equal to the thickness of the camber sheet 9. In forming the modified area 10, the cavity adjacent the leading edge 2 is tapered adjacent the tip. The camber sheet 9 is of less length than the airfoil portion of the blade and is formed with a leading edge portion adjacent the tip thereof that is relieved towards the trailing edge to mate with the undercut rim 11 in the area 10 of the thrust member. When the intimate contacting areas of the thrust member and camber sheet are bonded together, the surfaces of the thrust member in the area 10 and the camber sheet are substantially flush. However, as is shown in Fig. 4, throughout the rest of the airfoil portion, the camber sheet 9 overlaps the leading and trailing edges of the thrust member, and the joint therebetween is coincident with the marginal periphery of a part of the leading edge and trailing edge as clearly shown in the drawings.

By removing the juncture between the camber sheet and the thrust member from the edge of the blade in the region of the tip and a portion of the leading edge, the separation of the camber sheet from the thrust member due to erosion, caused by impingement with water spray, will be successfully prevented. In this manner the life span of this type of propeller blade on an amphibious aircraft is substantially prolonged, in that the blade can be reworked without any sacrifice in the aerodynamic efficiency thereof.

While the embodiment of the present invention as herein disclosed, constitutes a preferred form, it is to be understood that other forms might be adopted.

What is claimed is as follows:

1. A hollow blade including, a thrust member having upstanding leading and trailing edge portions and a tip portion, said leading edge portion being of gradually increased area throughout a portion of its length towards and adjacent said tip, a camber member having a complementary portion of its leading edge relieved, and means uniting the contacting portions of said members, the construction and arrangement being such that the joint between the camber member and the thrust member is coincident with the marginal periphery of a part of the leading edge portion but spaced from the marginal periphery of said leading edge portion adjacent the tip.

2. In a hollow propeller blade having an airfoil section, a thrust member having a plurality of longitudinally extending ribs, upstanding leading and trailing edge portions and a tip portion, said ribs and leading and trailing edge portions defining therebetween a plurality of cavities, a camber member united to said ribs, the leading edge, the trailing edge, and the tip portion to complete the blade airfoil section, said leading edge portion being of gradually increased area throughout a portion of its length towards and adjacent said tip, said camber sheet being of less length than the airfoil section of said thrust member and having a complementary portion of gradually reduced area adjacent the leading edge thereof, the construction and arrangement being such that the joint between the camber member and the thrust member is coincident with the marginal periphery of a part of the leading edge portion but spaced from the marginal periphery of said leading edge portion adjacent the tip.

3. A hollow propeller blade including a thrust member having projecting leading and trailing edge portions extending from the root to the tip of said blade, said leading edge portion having a gradually increased area throughout at least one tenth of its length towards and adjacent said tip, a camber member having a complementary portion of its leading edge relieved so as to be of gradually decreasing area adjacent said tip, said members defining a cavity therebetween, and means uniting contiguously disposed portions of said members, the construction and arrangement being such that the joint between the camber member and the thrust member is coincident with the marginal periphery of a part of the leading edge portion but spaced from the marginal periphery of said leading edge portion adjacent the tip.

4. In a hollow propeller blade, a metal thrust member having a longitudinally extending rib, a leading edge, a trailing edge and a tip, said leading edge having a gradually increasing area throughout at least one tenth its length towards and adjacent said tip, a camber sheet having a complementary portion of its leading edge relieved so as to be of gradually decreasing area adjacent said tip, said member and said sheet defining a plurality of longitudinally extending cavities therebetween, and means uniting the intimate contacting areas of said member and said sheet, the construction and arrangement being such that the joint between the camber sheet and the thrust member is coincident with the marginal periphery of a part of the leading edge but spaced from the marginal periphery of the leading edge adjacent the tip.

5. In a hollow propeller blade, a thrust member having upstanding integral leading and trailing edge portions which merge to form a solid blade tip, said leading edge portion being of gradually increased area towards and adjacent said tip, a camber member having a gradually reduced area adjacent one end thereof, and means uniting said members whereby a substantially flush surface is produced between said tip and a portion of said leading edge and said camber member, the construction and arrangement being such that the joint between the camber member and the thrust member is coincident with the marginal periphery of a part of the leading edge portion but spaced from the marginal periphery of said leading edge portion adjacent the tip.

References Cited in the file of this patent

UNITED STATES PATENTS

| | | |
|---|---|---|
| 1,992,338 | Whitworth | Feb. 26, 1935 |
| 2,006,340 | Baumann | July 2, 1935 |
| 2,205,132 | Blanchard | June 18, 1940 |
| 2,231,750 | Damerell | Feb. 11, 1941 |
| 2,293,801 | Caldwell | Aug. 25, 1942 |